United States Patent
Kondo et al.

(10) Patent No.: US 6,285,712 B1
(45) Date of Patent: Sep. 4, 2001

(54) IMAGE PROCESSING APPARATUS, IMAGE PROCESSING METHOD, AND PROVIDING MEDIUM THEREFOR

(75) Inventors: Tetsujiro Kondo, Tokyo; Hideo Nakaya, Kanagawa; Kenji Tanaka, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/221,255

(22) Filed: Dec. 28, 1998

(30) Foreign Application Priority Data

Jan. 7, 1998 (JP) ................................... P10-013456

(51) Int. Cl.[7] .................................................. H04N 7/12
(52) U.S. Cl. ........................................ 375/240.16; 348/699
(58) Field of Search ........................ 375/240.12, 240.16, 375/240.17; 348/699, 700, 416.1, 402.1, 407.1, 413.1; 386/109, 111; 382/236, 238; H04N 7/12

(56) References Cited

U.S. PATENT DOCUMENTS

| | | | |
|---|---|---|---|
| 5,469,214 | 11/1995 | Bazzaz | 348/416 |
| 5,706,367 | * 1/1998 | Kondo et al. | 348/415.1 |
| 5,872,604 | * 2/1999 | Ogura | 348/699 |
| 5,960,118 | * 9/1999 | Briskin et al. | 382/243 |
| 6,078,616 | * 6/2000 | Ozcelik et al. | 375/240 |

FOREIGN PATENT DOCUMENTS

| | | | |
|---|---|---|---|
| 0360698 A1 | 3/1990 | (EP) | G06F/15/70 |
| 0574192 A2 | 12/1993 | (EP) | G06F/15/70 |

* cited by examiner

*Primary Examiner*—Howard Britton
*Assistant Examiner*—Nhon T. Diep
(74) *Attorney, Agent, or Firm*—Bell, Boyd & Lloyd LLC

(57) ABSTRACT

An estimation section calculates the motion vector of each pixel and its reliability from two continuous frames, and generates first-order motion distribution images corresponding to the k-th and (k+1)-th frames with any motion vector and reliability being assigned to each pixel. An update section combines the input first-order motion distribution image corresponding to the (k+1)-th frame and the fourth-order motion distribution image corresponding to the (k+1)-th frame generated from the first-order motion distribution image corresponding to the k-th image to generate the second-order motion distribution image corresponding to the (k+1)-th frame. A prediction section generates the third-order motion distribution image corresponding to the (k+2)-th frame according to the input second-order motion distribution image corresponding to the (k+1)-th frame. An interpolation section interpolates into a blank space of the third-order motion distribution image corresponding to the (k+2)-th frame with the use of unbiased estimate to generate the fourth-order motion distribution image corresponding to the (k+2)-th frame.

35 Claims, 11 Drawing Sheets

SECOND-ORDER MOTION
DISTRIBUTION IMAGE

THIRD-ORDER MOTION
DISTRIBUTION IMAGE

SECOND-ORDER MOTION
DISTRIBUTION IMAGE

THIRD-ORDER MOTION
DISTRIBUTION IMAGE

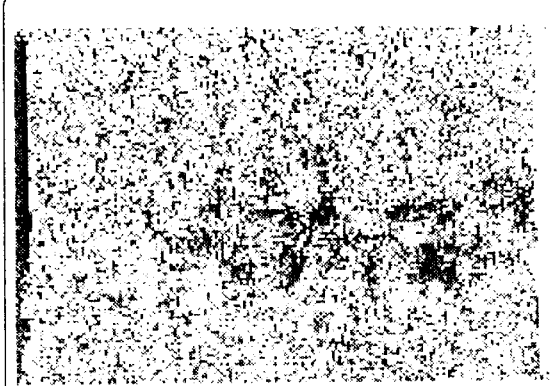
FIRST-ORDER MOTION
DISTRIBUTION IMAGE AT fr = 0
THIRD-ORDER MOTION
DISTRIBUTION IMAGE AT fr = 1
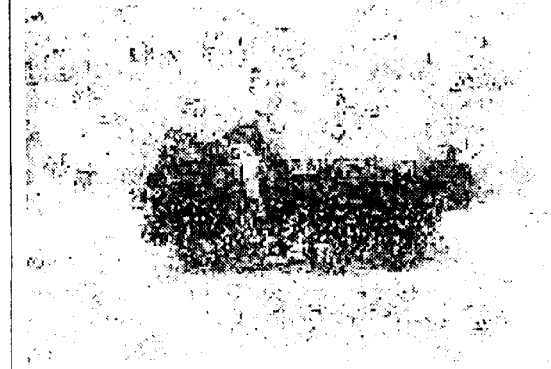
THIRD-ORDER MOTION
DISTRIBUTION IMAGE AT fr = 4
FIG. 10A
FIRST-ORDER MOTION
DISTRIBUTION IMAGE AT fr = 0
THIRD-ORDER MOTION
DISTRIBUTION IMAGE AT fr = 1
THIRD-ORDER MOTION
DISTRIBUTION IMAGE AT fr = 4
FIG. 10B

SOURCE IMAGE

THIRD-ORDER MOTION
DISTRIBUTION IMAGE AT fr = 1

THIRD-ORDER MOTION
DISTRIBUTION IMAGE AT fr = 4

IMAGE PROCESSING APPARATUS, IMAGE PROCESSING METHOD, AND PROVIDING MEDIUM THEREFOR

CROSS-REFERENCE TO RELATED APPLICATIONS

The present application is related to U.S. patent application Ser. No. 08/816,867 now U.S. Pat. No. 6,078,616, filed Mar. 13, 1997, which is assigned, in part, to the assignee of the present invention, and to U.S. patent application Ser. No. 08/837,491 now U.S. Pat. No. 5,872,604, filed Apr. 18, 1997, which is assigned to the assignee of the present invention, and both of said related U.S. Patent Applications are incorporated herein by reference.

BACKGROUND OF THE INVENTION

1. Field of the Invention

The present invention relates to image processing apparatuses, image processing methods, and recording media therefor, and more particularly, to an image processing apparatus, an image processing method, and a recording medium therefor, in which motion can be estimated in units of pixels from images continuous in time.

2. Description of the Related Art

As a method for estimating a parameter which indicates an image motion (hereinafter called motion estimation) from a motion picture, there has been known a method using a minimum predictive residual rule, for example, a block matching method. In the motion-estimation method using the minimum predictive residual rule, since an image is divided into blocks formed of a plurality of pixels and motion estimation is performed in units of blocks, the spatial resolution of motion estimation is low and motion estimation can be performed only for a rigid body whose constituent parts move in parallel. As a result, motion estimation cannot be performed using this method for a nonrigid body having uneven motion distribution.

In the motion-estimation method using the minimum predictive residual rule, for example, with the block matching method, when an actual movement is out of a search range, motion estimation has a large error, and a low robustness appears. Accordingly, it would be desirable to provide a method, apparatus and computer program for increasing spatial resolution in motion estimation of an image and to ensure robustness. The present invention has been made in consideration of the above conditions.

BRIEF SUMMARY OF THE INVENTION

It is an object of the present invention to increase the spatial resolution of motion estimation and to ensure robustness by a non-decision-theory method with the use of unbiased estimate.

It is a feature of the present invention to perform motion estimation in units of pixels by the use of unbiased estimation, thereby increasing the spatial resolution of motion estimation and robustness.

It is an advantage of the present invention to increase spatial resolution in the motion estimation of an image.

According to one aspect of the invention, a method for estimating motion of a motion picture, the motion picture comprising a plurality of images includes the steps of estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image; estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image; updating the first-order motion distribution image corresponding to the (k+1)-th image to generate a second-order motion distribution image corresponding to the (k+1)-th image; predicting, from the image second-order motion distribution image corresponding to the (k+1)-th image, a third-order motion distribution image corresponding to the (k+2)-th image; and interpolating the third-order motion distribution image corresponding to the (k+2)-th image to generate a fourth-order motion distribution image corresponding to the (k+2)-th image, where k is an integer, and wherein the step of updating updates the first-order motion image distribution image corresponding to the (k+1)-th image using a higher than first-order motion distribution image generated from the k-th image.

According to a further aspect of the present invention, an apparatus for estimating motion of a motion picture, the motion picture comprising a plurality of images includes means for estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image; means for estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)th image; means for updating the first-order motion distribution image corresponding to the (k+1)-th image to generate a second-order motion distribution image corresponding to the (k+1)-th image; means for predicting, from the image second-order motion distribution image corresponding to the (k+1)-th image, a third-order motion distribution image corresponding to the (k+2)-th image; and means for interpolating the third-order motion distribution image corresponding to the (k+2)-th image to generate a fourth-order motion distribution image corresponding to the (k+2)-th image, where k is an integer, and wherein the means for updating updates the first-order motion image distribution image corresponding to the (k+1)-th image using a higher than first-order motion distribution image generated from the k-th image.

According to another aspect of the present invention, an apparatus for estimating motion of a motion picture, where the motion picture comprising a plurality of images, includes a circuit for estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image; a circuit for estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image; a circuit for updating the first-order motion distribution image corresponding to the (k+1)-th image to generate a second-order motion distribution image corresponding to the (k+1)-th image; a circuit for predicting, from the image second-order motion distribution image corresponding to the (k+1)-th image, a third-order motion distribution image corresponding to the (k+2)-th image; and a circuit for interpolating the third-order motion distribution image corresponding to the (k+2)-th image to generate a fourth-order motion distribution image corresponding to the (k+2)-th image, where k is an integer, and wherein the circuit for updating updates the first-order motion image distribution image corresponding to the (k+1)-th image using a higher than first-order motion distribution image generated from the k-th image.

According to yet a further aspect of the present invention, an apparatus for estimating motion of a motion picture, the motion picture comprising a plurality of images, includes a first estimator for estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image; a second estimator for estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image; an updater for updating the first-order motion distribution image corresponding to the (k+1)-th image to generate a second-order motion distribution image corresponding to the (k+1)-th image; a predictor for predicting, from the image second-order motion distribution image corresponding to the (k+1)-th image, a third-order motion distribution image corresponding to the (k+2)-th image; and an interpolator for interpolating the third-order motion distribution image corresponding to the (k+2)-th image to generate a fourth-order motion distribution image corresponding to the (k+2)-th image, where k is an integer, and wherein the circuit for updating updates the first-order motion image distribution image corresponding to the (k+1)-th image using a higher than first-order motion distribution image generated from the k-th image.

According to yet another aspect of the present invention, a program storage device readable by a machine, tangibly embodies a program of instructions executable by the machine to perform method steps for estimating motion of a motion picture, where the steps include estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image; estimating from at least the (k+1)-th image a motion parameter corresponding to each pixel of the (k+1)th image to generate a first-order motion distribution image corresponding to the (k+1)-th image, the first-order motion distribution image corresponding to the (k+1)-th image represented by the motion parameters corresponding to the pixels of the (k+1)-th image; updating the first-order motion distribution image corresponding to the (k+1)-th image to generate a second-order motion distribution image corresponding to the (k+1)-th image; predicting, from the image second-order motion distribution image corresponding to the (k+1)-th image, a third-order motion distribution image corresponding to the (k+2)-th image; and interpolating the third-order motion distribution image corresponding to the (k+2)-th image to generate a fourth-order motion distribution image corresponding to the (k+2)-th image, where k is an integer, and wherein the step of updating updates the first-order motion image distribution image corresponding to the (k+1)-th image using a higher than first-order motion distribution image generated from the k-th image.

These and other objects, features and advantages will become apparent when considered with reference to the following description and the accompanying drawings, where like reference numerals refer to the same or similar elements.

BRIEF DESCRIPTION OF THE OF THE DRAWINGS

FIGS. 10A and 10B are photographs of gray-scale images shown on a display for comparison between the present invention and conventional image processing.

DETAILED DESCRIPTION OF THE INVENTION

Figure 1:
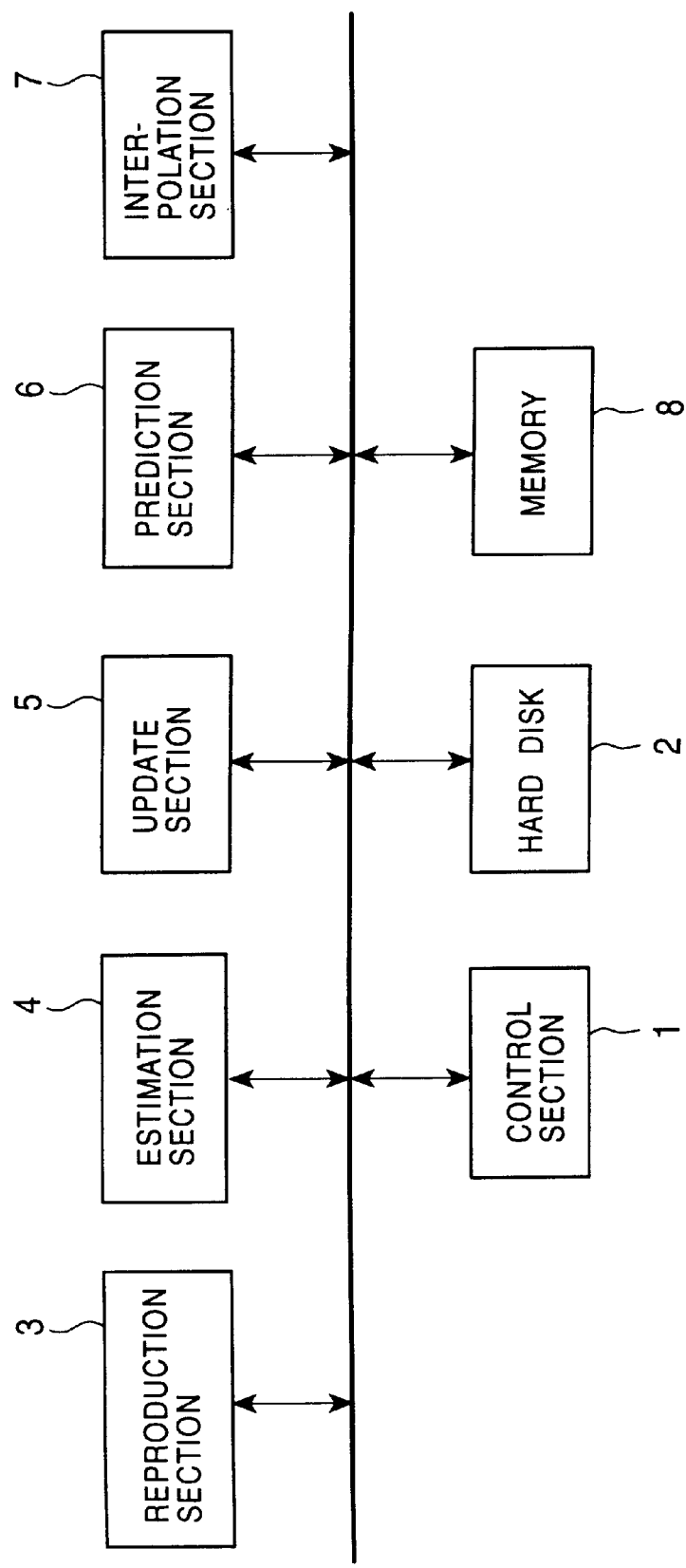
FIG. 1 is a block diagram showing a configuration of an image processing apparatus to which the present invention is applied.

An embodiment of the present invention is now described below. A configuration of an image processing apparatus to which the present invention is applied will be described below by referring to FIG. 1. A control section 1 in this image processing apparatus controls the whole apparatus. A hard disk 2 stores motion pictures input in advance, and outputs the motion pictures to a reproduction section 3 according to control by the control section 1. A series of motion pictures (one scene) is formed of a plurality of still images (frames) to which serial frame numbers (fr=0, 1, 2, . . . k, k+1, . . . N) are assigned.

The reproduction section 3 reproduces the motion pictures sent from the hard disk 2, in units of frames (as still images) and outputs such data to an estimation section 4.

The estimation section 4 calculates a motion vector for each pixel and its reliability corresponding to the k-th frame from the k-th and (k+1)-th frames which are continuous in time order and sent from the reproduction section 3. The estimation section 4 also generates the first-order motion distribution image corresponding to the k-th frame by assigning a motion vector and its reliability to each pixel (performing unbiased estimation), and outputs such data to an update section 5. The first-order motion distribution image corresponding to the 0th frame is outputted to a prediction section 6.

The update section 5 combines the first-order motion distribution image corresponding to the (k+1)-th frame sent from the estimation section 4 and the fourth-order motion distribution image corresponding to the (k+1)-th frame sent from an interpolation section 7 (described later) to generate the second-order motion distribution image corresponding to the (k+1)-th frame and outputs it to the prediction section 6. In the case of the first-order motion distribution image corresponding to the 0th frame (fr=0), this update operation is not performed.

The prediction section 6 predicts the third-order motion distribution image corresponding to the (k+1)-th frame according to the second-order motion distribution image corresponding to the k-th frame sent from the update section 5 (or in the case of fr=0, the first-order motion distribution image corresponding to the 0th frame sent from the estimation section 4) and outputs it to the interpolation section 7. In this case, the motion vector for each pixel in the third-order motion distribution image is predicted with an assumption that the motion vector for each pixel in the second-order distribution image (or in the case of fr=0, the first-order motion distribution image corresponding to the 0th frame) does not change.

The interpolation section 7 interpolates into a blank space of the third-order motion distribution image corresponding to the input (k+1)-th frame with the use of an unbiased estimate to generate the fourth-order motion distribution image corresponding to the (k+1)-th frame. The fourth-order motion distribution image corresponding to the (k+1)-th frame is outputted as a final motion distribution image representing motion from the k-th frame to the (k+1)-th frame and is provided to the update section 5.

A memory 8 temporarily stores information as a work area of each section and outputs it to each section. As shown in FIG. 1, the control section 1, hard disk 2, reproduction section 3, estimation section 4, update section 5, prediction section 6, interpolation section 7 and memory 8 are coupled via a bus 9.

An operation of this image processing apparatus will be described below by referring to a flowchart shown in FIG. 2 and FIG. 3. In a step S1, the control section 1 checks for the total number N of frames constituting one scene stored in the hard disk 2, and initializes a parameter fr indicating the order of the frames (fr is set to zero).

In a step S2, it is determined whether or not fr is N (N indicates the last frame). When it is determined that fr is not N, the processing proceeds to a step S3.

Figure 4:
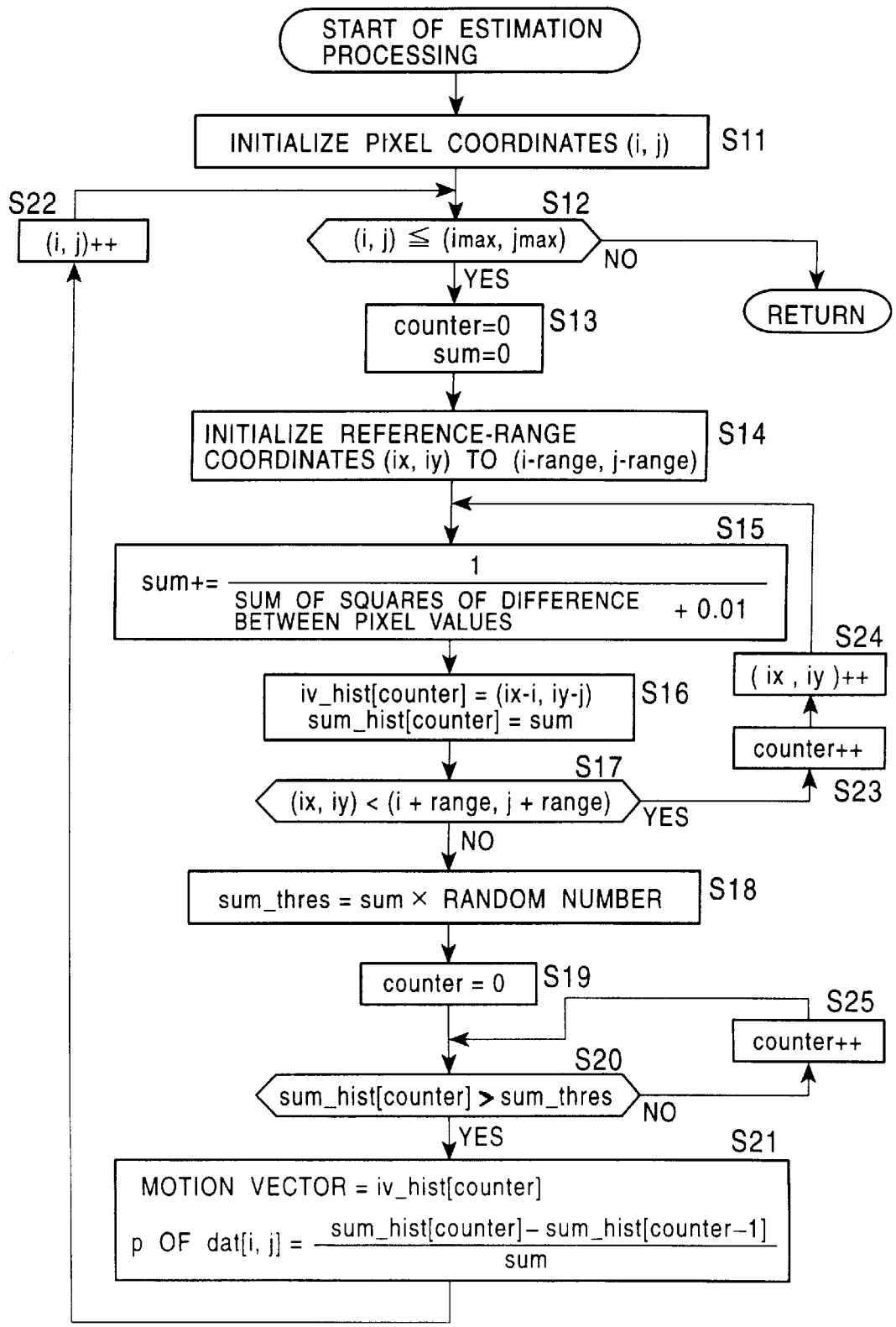
FIG. 4 is a flowchart of estimation processing shown in a step S3 of FIG. 2.

In the step S3, estimation processing is executed. Details of the estimation processing will be described below by referring to the flowchart of FIG. 4.

In a step S11, the coordinates (i, j) of the pixel to be estimated in an estimated frame (the k-th frame) are initialized to (0, 0). In a step S12, it is determined whether the coordinates (i, j) of the pixel to be estimated are not larger than the maximum ($i_{max}$, $j_{max}$) (that is, within a frame). When it is determined that the coordinates (i, j) of the pixel to be estimated are not larger than the maximum (imax, jmax) (that is, within the frame), the processing proceeds to a step S13.

In the step S13, variables "counter" and "sum" are set to zero. In a step S14, the coordinates (ix, iy) of a referenced pixel in the referenced frame (the (k+1)-th frame) are initialized to (i-range, j-range). The referenced pixel area in the reference frame is a square having a side with the specified length, a 2×range, and having a center at the coordinates (i, j). Therefore, the coordinates (ix-range, iy-range) indicate the pixel at the upper left corner of the referenced area.

In a step S15, the value of 1/(the sum of the squares of the difference between the pixel values of the pixel (i, j) to be estimated and the referenced pixel (ix, iy)+0.01) is calculated and added to the variable "sum." The value 0.01 is a compensation value for preventing the reliability from diverging to infinite.

In a step S16, the differences (ix–i, iy–j) (motion vector) between the coordinates (ix, iy) of the reference pixel and the coordinates (i,j) of the pixel to be estimated are calculated. The calculated values (motion vector) are disposed in an array iv_hist[counter] with the serial number "counter" of the pixel in the referenced area. In the same way, the variable "sum" is disposed in an array sum_hist[counter] with the serial number "counter" of the pixel in the referenced area. The variable "sum" and the array sum_hist[counter] are used for calculating reliability p in a step S21 described later.

In a step S17, it is determined whether the coordinates (ix, iy) of the referenced pixel are smaller than the maximum (i+range, j+range) (whether a pixel which has not yet been referenced exists within the referenced area). When it is determined that they are not smaller (that all the pixels in the referenced area have been referenced), the processing proceeds to a step S18. If a pixel which has not yet been referenced does exist, the processing proceeds to a step S23 and the variable "counter" is incremented. The processing then proceeds to a step S24, where the coordinates (ix, iy) are incremented. The processing of the step S15 is then executed with another pixel being set to be handled.

In the step S18, a variable "sum_thres" is defined as the variable "sum" multiplied by a random number (between 0 and 1). In other words, a threshold is defined with the use of a random number. In a step S19, the variable "counter" is initialized to zero.

In a step S20, it is determined whether the value of the array sum_hist[counter] is greater than sum_thres (threshold) defined at random in the step S18 (whether it is inappropriate as a referenced pixel). If the value of the array sum_hist[counter] is less than or equal to sum_thres (it is inappropriate as a referenced pixel), the processing proceeds to a step S25. The variable "counter" is incremented and the processing returns to the step S20. As described in the step S15, since processed values are sequentially accumulated in the variable "sum," when the variable "counter" becomes large, the value of sum_hist[counter] also becomes large. As a result, a possibility that the value of sum_hist[counter] becomes larger than the value of sum_thres increases.

When it is determined that the value of the array sum_hist[counter] is greater than sum_thres (that is, the pixel is appropriate as a referenced pixel), the processing proceeds to a step S21. In the step S21, the motion vector disposed in the array "iv_hist[counter]" corresponding to the array "sum-hist [counter]" is copied as the motion vector of the pixel to be estimated (the pixel at the coordinates (i, j)), and the value of (sum_hist[counter]–sum_hist[counter–1])/sum is calculated as its reliability p and set.

In a step S22, the coordinates (i, j) are incremented. The processing returns to the step S12 with other coordinates being set to be processed.

Figure 2:
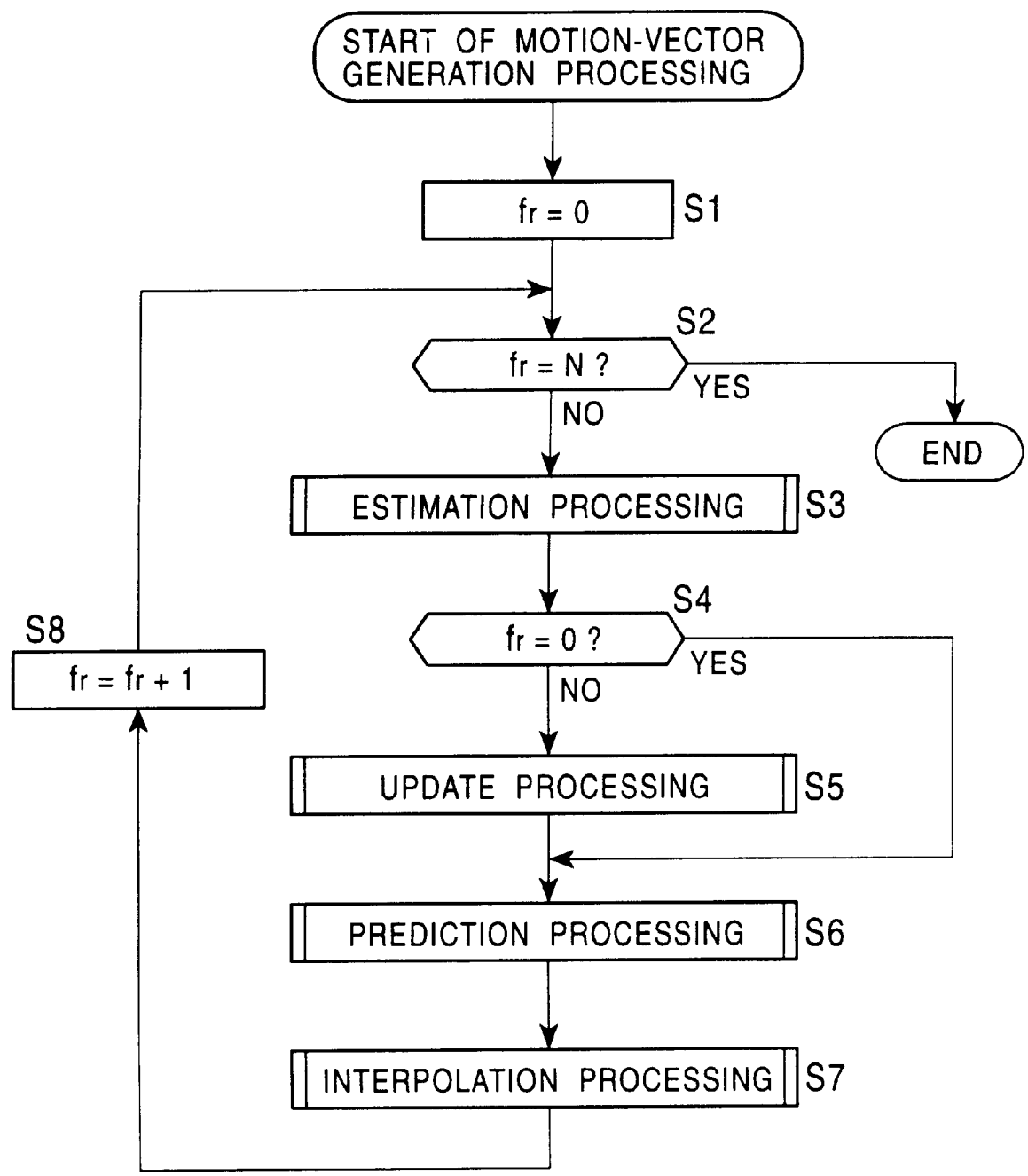
FIG. 2 is a flowchart illustrating operations of the image processing apparatus shown in FIG. 1.

In the step S12, if it is determined that (i, j) are larger than the maximum ($i_{max}$, $j_{max}$) (not within the frame), the estimation processing for the first-order estimation distribution image corresponding to the fr-th frame is finished and the processing for the first-order estimation distribution image corresponding to the fr-th frame returns to the step S3 in FIG. 2.

Figure 3:
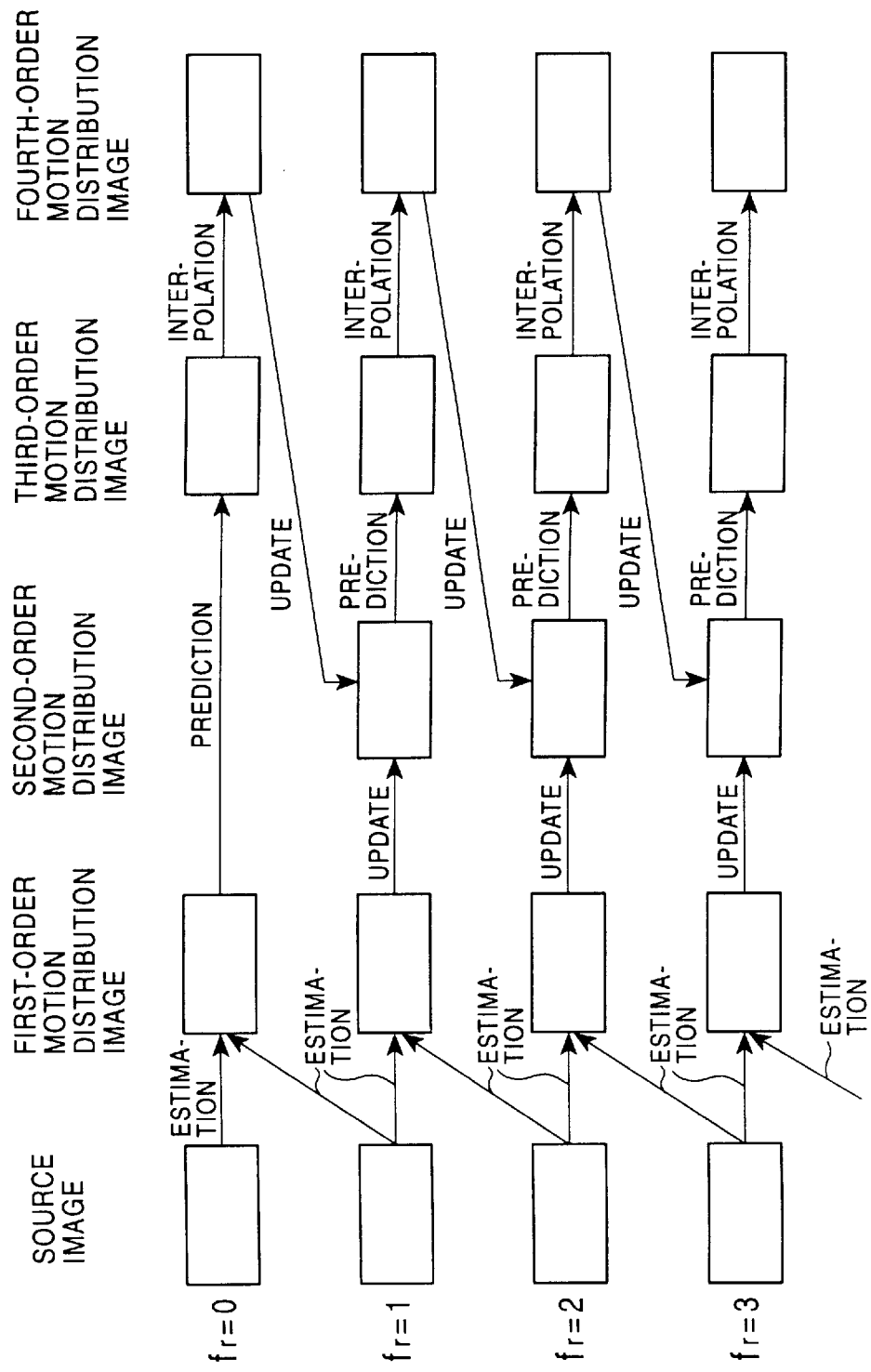
FIG. 3 is a view showing operations of the image processing apparatus shown in FIG. 1.

In the foregoing way, the first-order motion distribution image for fr=0 shown in FIG. 3 has, for example, been generated with the use of unbiased estimate.

The flowchart shown in FIG. 2 will be again described.

After the estimation processing has been performed in the foregoing way, it is determined in a step S4 whether the frame parameter fr=0 (indicates the start frame). When it is determined that fr is not zero, the processing proceeds to a step S5. In the step S5, the update section 5 executes update processing. If, however, fr equal to is zero at first, the update processing in the step S5 is skipped and the processing proceeds to a step S6.

Figure 5:
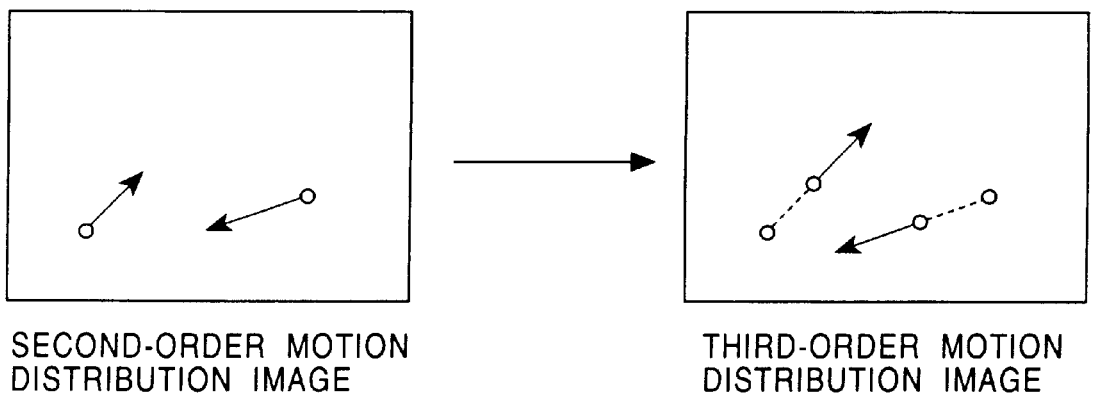
FIG. 5 is a view illustrating prediction processing shown in a step S6 of FIG. 2.
Figure 6:
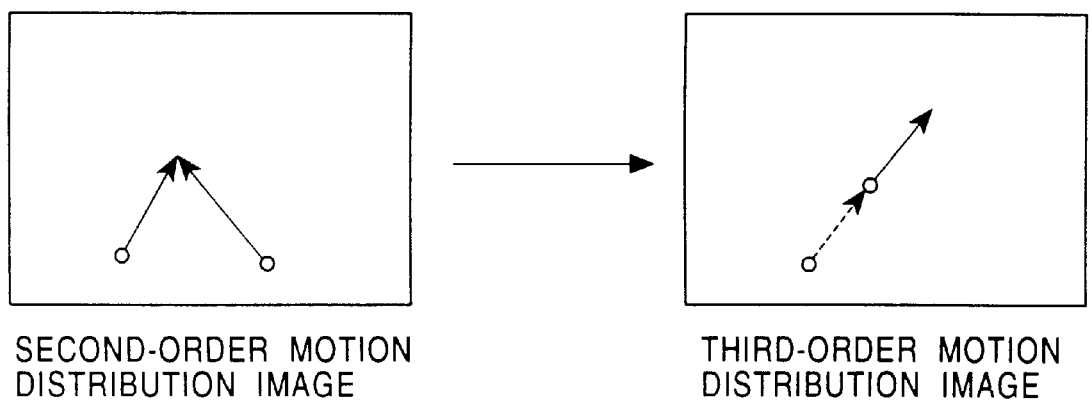
FIG. 6 is another view illustrating the prediction processing shown in the step S6 of FIG. 2.
Figure 7:
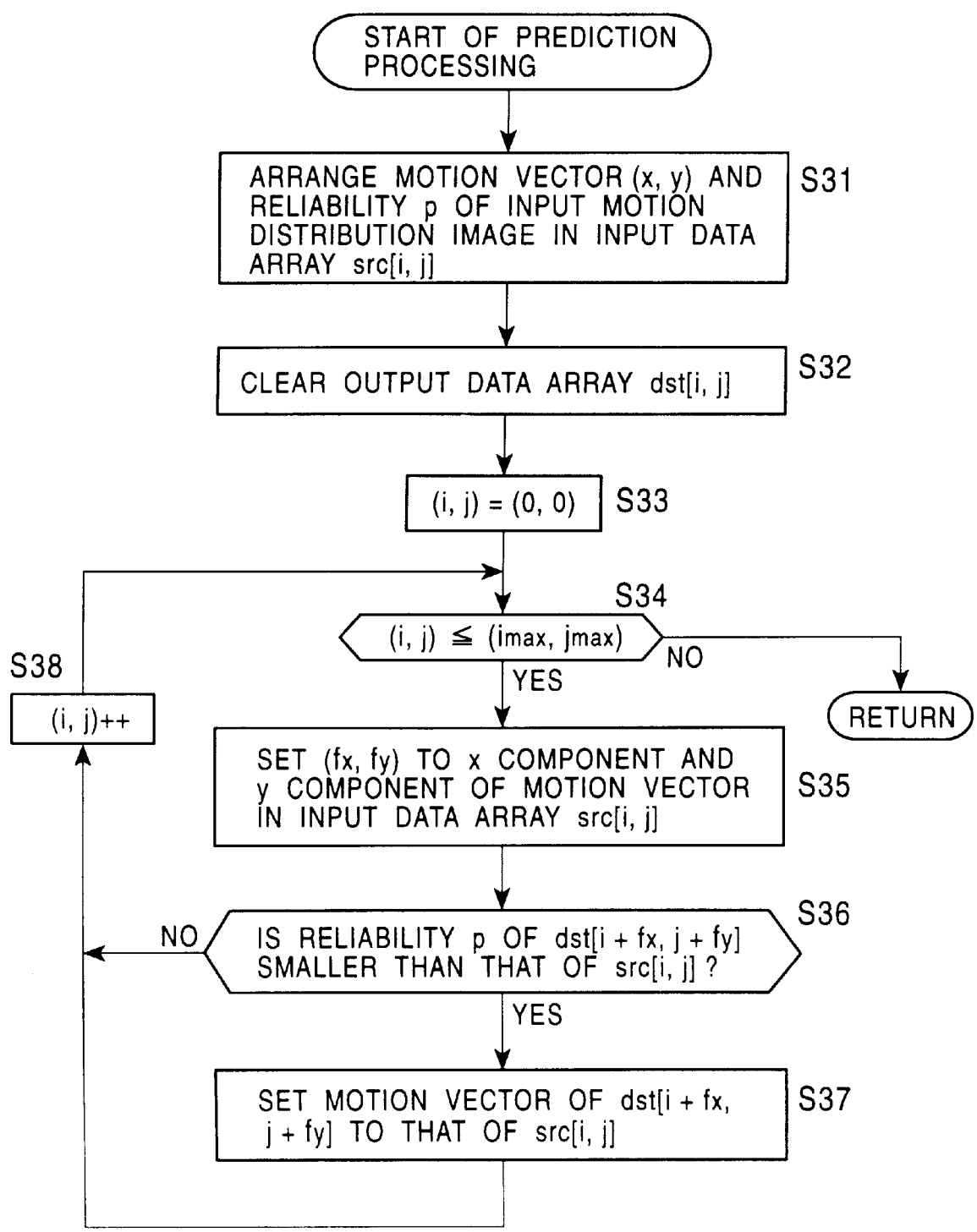
FIG. 7 is a flowchart of the prediction processing shown in the step S6 of FIG. 2.

In the step S6, prediction processing is executed as shown in FIG. 5. Namely, a motion vector for each pixel corresponding to the (fr+1)-th frame is predicted with an assumption that pixels move at the same speed in the input second-order motion distribution image corresponding to the fr-th frame (or the first-order motion distribution image corresponding to the 0th frame if fr is zero). Also, as shown in FIG. 6, when a plurality of motion vectors can be considered, the motion vector having the maximum reliability p is employed. Details of the prediction processing will be described below by referring to the flowchart of FIG. 7.

In a step S31, the motion vector (x, y) and the reliability p of the input second-order motion distribution image corresponding to the fr-th frame (or the first-order motion distribution image corresponding to the fr-th frame if fr is zero) are arranged in an input data array src[i, j].

In a step S32, an output array dst[i, j] is initialized (motion vectors and reliabilities p are all set to zero). In a step S33, the coordinates (i, j) of the pixel to be predicted are initialized to (0, 0).

In a step S34, it is determined whether the coordinates (i, j) of the pixel to be predicted of the fr-th frame are not larger than the maximum (imax, jmax) (within the frame). If it is determined that the coordinates (i, j) are not larger than the maximum (imax, jmax) (within the frame), the processing proceeds to a step S35.

In the step S35, variables (fx, fy) are set to the motion vector (x, y) of the input data array src[i, j] (fx is set to the x component of the motion vector, and fy is set to the y component of the motion vector).

In a step S36, it is determined whether the reliability p of dst[i+fx, j+fy] is smaller than that of src[i, j]. When it is determined that the reliability p of dst[i+fx, j+fy] is smaller than that of src[i, j], the processing proceeds to a step S37. In the step S37, the motion vector of dst[i+fx, j+fy] (motion vector of the third-order motion distribution image) is set to that of src[i, j]. In other words, the processing shown in FIG. 6 is executed. When it is determined that the reliability p of dst[i+fx, j+fy] is not smaller than that of src[i, j], or when the step S37 has been finished, the coordinates (i, j) are incremented in step S38 and the processing then returns to the step S34 with another pixel being set to be handled.

In the step S34, when it is determined that the coordinates (i, j) of the pixel to be predicted are larger than the maximum (imax, jmax) (not within the frame), the prediction processing is finished and the processing returns to the step S6 in FIG. 2. In the foregoing way, a third-order motion distribution image corresponding to the (fr+1)-th frame is obtained by the prediction processing shown in FIG. 3.

The processing shown in FIG. 2 will again be described.

Figure 8:
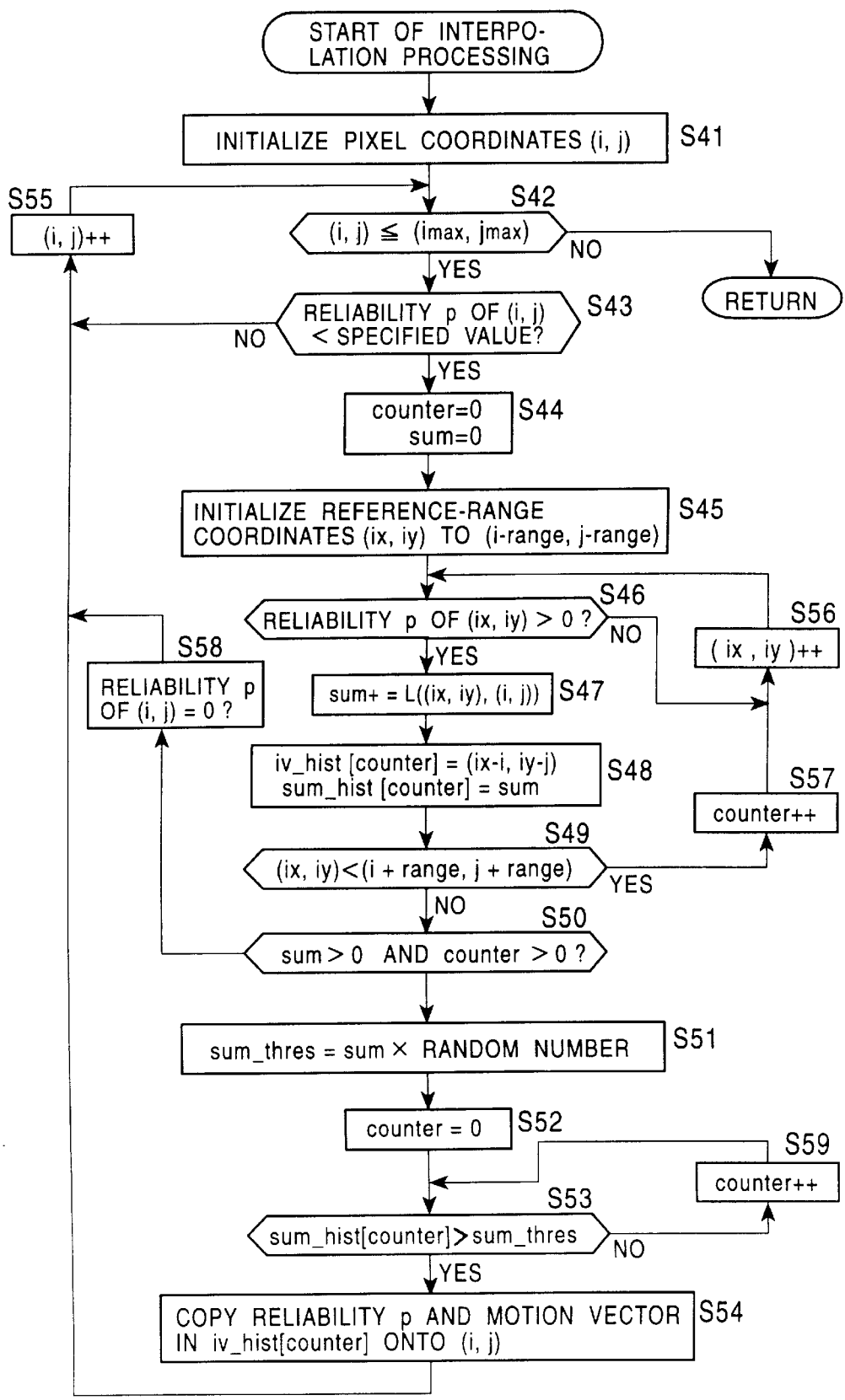
FIG. 8 is a flowchart of interpolation processing shown in a step S7 of FIG. 2.

After the prediction processing for the third-order motion distribution image corresponding to the (fr+1)-th frame has been executed in the foregoing way, the interpolation section 7 executes interpolation processing to the third-order motion distribution image corresponding to the (fr+1)-th frame in a step S7. Details of the interpolation processing will be described below by referring to a flowchart shown in FIG. 8.

In a step S41, the coordinates (i, j) of a pixel of the (fr+1)-th frame which is to be interpolated (interpolation target) is initialized to (0, 0). In a step S42, it is determined whether the coordinates (i, j) are not larger than the maximum ($i_{max}$, $j_{max}$) (are within a frame). When it is determined that the coordinates (i, j) of the pixel to be interpolated are not larger than the maximum (imax, jmax) (are within a frame), the processing proceeds to a step S43.

In the step S43, the interpolation section 7 determines whether the reliability p(i, j) of the pixel at the coordinates (i, j) is less than the specified reference value. When it is determined that the reliability p is less than the specified reference value (the pixel lacks information), the processing proceeds to a step S44. When the reliability p(i, j) is not smaller than the specified value, since the pixel does not lack information, interpolation processing is unnecessary. The processing proceeds to a step S55. The coordinates (i, j) are incremented. The processing then returns to the step S42 with another pixel being set to be handled, and the same processing is executed.

In the step S44, variables "counter" and "sum" are set to zero. In a step S45, the coordinates (ix, iy) of a referenced pixel in the reference frame (the (fr+1)-th frame) are initialized to (i-range, j-range). The referenced pixel area is a square having a side with the specified length, 2×range, and having a center at the coordinates (i, j). Therefore, the coordinates (i-range, j-range) indicate the pixel at the upper left corner of the referenced area.

In a step S46, the interpolation section 7 determines whether the reliability p(ix, iy) of the pixel at the coordinates (ix, iy) is larger than zero. When it is determined that the reliability is larger than zero (that the pixel is appropriate as the source pixel for copying its information (pixel value) onto a pixel which lacks information), the processing proceeds to a step S47. When the reliability p is zero, the pixel is inappropriate as the copy-source pixel. The processing therefore proceeds to a step S56. The coordinates (ix, iy) are incremented and the processing returns to the step S46 with another pixel being set to be handled.

In step S47, the value of L((ix, iy), (i, j)) is added to the variable "sum," where L((ix, iy), (i, j)) indicates a function which shows whether the pixel at the coordinates (ix, iy) is appropriate as the copy-source pixel for the pixel (i, j) to be interpolated and is expressed as follows:

$$L((ix, iy), (i, j)) = p(ix, iy) \times \mathrm{Exp}(-D1((ix, iy), (i, j))/a - D2((ix, iy), (i, j))/b)$$

where p(ix, iy) indicates the reliability of the referenced pixel, D1((ix, iy), (i, j)) indicates the distance between the coordinates of (ix, iy) and (i, j), and D2((ix, iy), (i, j)) indicates the difference between the pixel values of (ix, iy) and (i, j).

In a step S48, the differences (ix−i, iy−j) (motion vector) between the coordinates (ix, iy) of the referenced pixel, which is regarded as a copy-source pixel whose pixel value is appropriate, and the coordinates (i, j) of the pixel to be interpolated are calculated. The calculated values (motion vector) are disposed in an array iv_hist[counter] with the serial number "counter" of the pixel in the referenced area. In the same way, the variable "sum" is disposed in an array sum_hist[counter] with the serial number "counter" of the pixel in the referenced area.

In a step S49, it is determined whether the coordinates (ix, iy) of the referenced pixel are smaller than the maximum (i+range, j+range) (whether a pixel which has not yet been referenced exists within the referenced area). When it is determined that they are not smaller (that all the pixels in the referenced area have been referenced), the processing proceeds to a step S50. If a pixel which has not yet been referenced remains, the processing proceeds to a step S57 and the variable "counter" is incremented. The processing then proceeds to a step S56. The coordinates (ix, iy) are incremented. The processing from the step S46 is executed with another pixel being set to be handled.

In a step S50, it is determined whether the variables "sum" and "counter" are larger than zero. When it is determined that both "sum" and "counter" are larger than zero (a pixel appropriate for a copy source exists in the referenced area), the processing proceeds to a step S51. When at least one of "sum" and "counter" is zero, since a pixel appropriate for a copy source does not exist in the referenced area, the processing proceeds to a step 58. The reliability p of the coordinates (ix, iy) is set to zero, and the processing proceeds to the step S55. The coordinates (ix, iy) are incremented, and the processing from the step S42 is executed with another pixel being set to be handled.

In the step S51, a variable "sum_thres" is defined as the variable "sum" multiplied by a random number (between 0 and 1). In other words, a threshold is defined with the use of a random number. In a step S52, the variable "counter" is initialized to zero.

In a step S53, it is determined whether the value of the array sum_hist[counter] is greater than sum_thres (threshold) defined at random in the step 51 (whether it is inappropriate as a copy-source pixel). If the value of the array sum_hist[counter] is not greater than sum_thres (it is inappropriate as a copy-source pixel), the processing proceeds to a step S59. The variable "counter" is incremented and the processing returns to the step S53. As described in the step S47, since processed values are sequentially accumulated in the variable "sum," when the variable "counter" becomes large, the value of sum_hist[counter] also becomes large. As a result, a possibility that the value of sum_hist[counter] becomes larger than the value of sum_thres increases.

When the value of the array sum_hist[counter] is greater than sum_thres (it is appropriate as a copy-source pixel), the processing proceeds to a step S54. In the step S54, the reliability and the motion vector disposed in the array "iv_hist[counter]" are copied as the reliability p(i, j) and the motion vector V1(i, j) of the pixel to be interpolated. Then, in the step S55, the coordinates (i, j) are incremented. The processing returns to the step S42 and the subsequent processing is executed.

In the step S42, if it is determined that (i, j) are larger than the maximum (imax, jmax) (not within the frame) (in other words, that all pixels in the frame have been processed), the interpolation processing is finished and the processing returns to the step S7 in FIG. 2.

In the foregoing way, a fourth-order motion distribution image corresponding to the (fr+1)-th frame has been generated by the interpolation processing with the use of an unbiased estimate as shown in FIG. 3. The fourth-order motion distribution image corresponding to the (fr+1)-th frame is outputted as the final motion distribution image and is used to update the first-order distribution image corresponding to the (fr+1)-th frame and to generate the second-order motion distribution image corresponding to the (fr−1)-th frame. The flowchart shown in FIG. 2 will be again described.

After the interpolation processing has been performed in the foregoing way, fr is incremented by 1 in a step S8, and the processing returns to the step S2.

Figure 9:
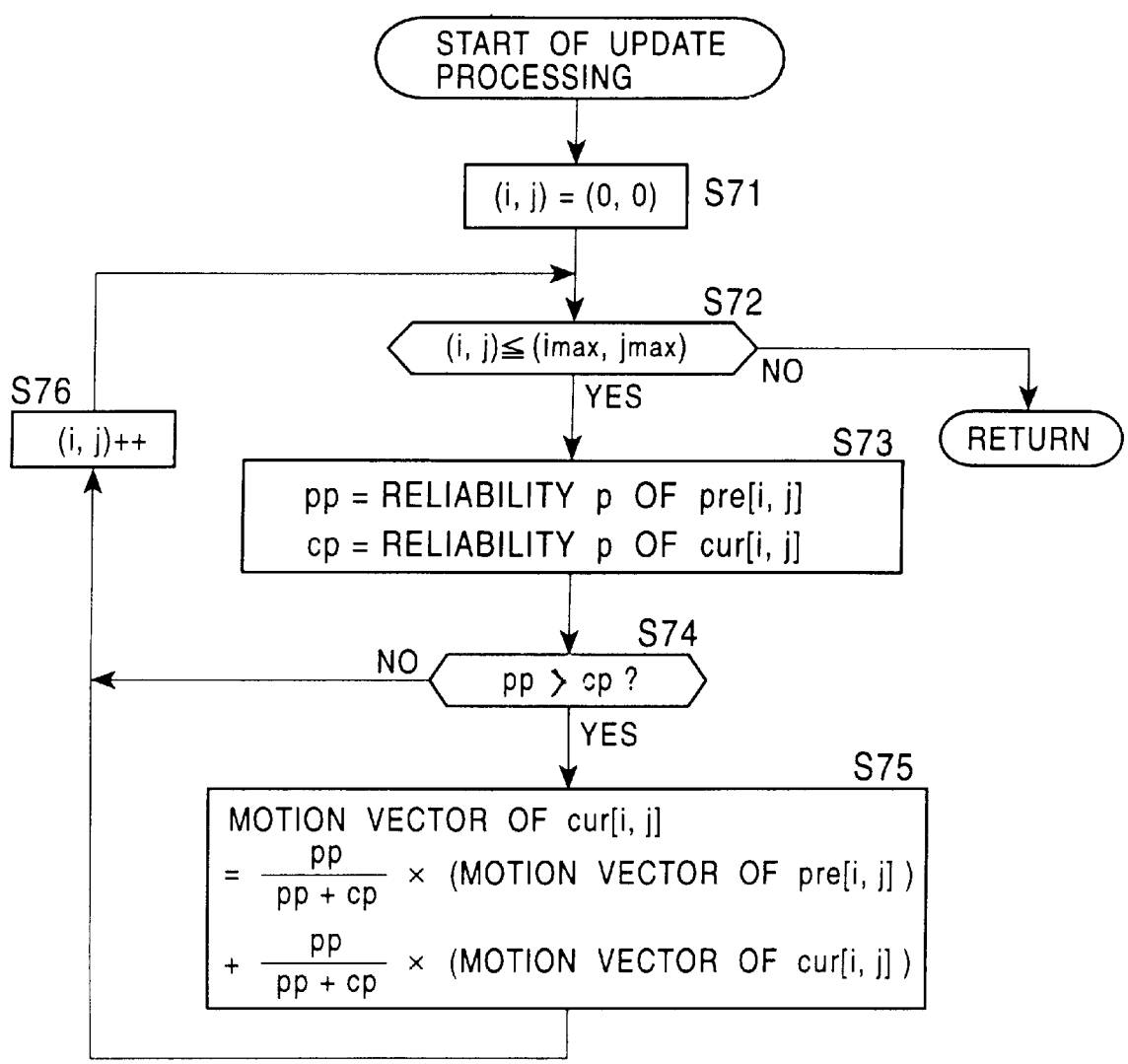
FIG. 9 is a flowchart of update processing shown in a step S5 of FIG. 2.

In the steps S2 and S3, the above processing is executed in the same way. In the step S4, since fr is not zero, the processing proceeds to the step S5, and the update section 5 executes update processing. Details of the update processing will be described below by referring to FIG. 9.

In a step S71, the coordinates (i, j) of the pixel to be updated is initialized to (0, 0). In a step S72, it is determined whether (i, j) are not larger than the maximum (imax, jmax) (are within a frame). When it is determined that (i, j) are not larger than the maximum (imax, jmax) (are within the frame), the processing proceeds to a step S73.

In the step S73, a variable pp is set to the reliability p of a data array pre[i, j] of the fourth-order motion distribution image corresponding to the still image having an fr of (k+1) (initially k=0) sent from the interpolation section 7. In the same way, a variable cp is set to the reliability p of a data array cur[i, j] of the first-order motion distribution image corresponding to the still image having an fr of (k+1) sent from the interpolation section 7.

In a step S74, it is determined whether the variable pp is greater than the variable cp. When it is determined that pp is greater than cp (the reliability p of the fourth-order motion distribution image is higher than that of the first-order motion distribution image), the processing proceeds to a step S75. When it is determined that pp is not greater than cp (the reliability p of the first-order motion distribution image is higher than that of the fourth-order motion distribution image), the motion vector is not updated and the processing proceeds to a step S76. The coordinates (i, j) are incremented and the processing returns to the step S72 with another pixel being set to be handled.

In the step S75, the weighted average of the motion vector of the first-order motion distribution image and that of the fourth-order motion distribution image are calculated from the following expression with the use of "pp" and "cp" to obtain and set the motion vector of the second-order motion distribution image corresponding to the (k+1)-th frame.

Motion vector of second-order motion distribution image

=(motion vector of pre[$i, j$])×{$pp/(pp+cp)$}+(motion vector of cur [$i, j$])×{$cp/(pp+cp)$}

In the step S72, when it is determined that (i, j) are larger than the maximum (imax, jmax), the update processing is finished and the processing returns to the step S5 in FIG. 2.

In the foregoing way, the second-order motion distribution image is obtained by the update processing as shown in FIG. 3.

Motion distribution images obtained by the above image processing apparatus will now be compared with those obtained by the conventional method. FIG. 10A shows motion distribution images obtained by an image processing apparatus to which the present invention is applied. FIG. 10B shows motion distribution images obtained according to the maximum likelihood estimation, which is a conventional method. The same images (in which a model truck moves in the left direction on a fixed table) are handled in both methods. In FIG. 10A, starting from the uppermost image, there are shown the first-order motion distribution images corresponding to the still image having an fr=0, the third-order motion distribution images corresponding to the still image having an fr=1, and a third-order motion distribution images corresponding to the still image having an fr=4. The density of a pixel in these images indicates the magnitude of the motion vector in the horizontal direction (in the left direction in the images).

In the images shown in FIG. 10B, the contour of the model truck is dim and pixels of a table, which is fixed and below the model, have a certain density (which is indicative of movement). On the other hand, in the images shown in FIG. 10A, information is accumulated as fr increases. The contour of the model truck therefore becomes clear and the density of pixels of the fixed portion (table) decreases. Stated differently, the relative contrast increases as between the fixed portion of the image and the moving portion of the image. Therefore, it is determined that FIG. 10A shows motion distribution images having a less erroneous decision.

With a correct motion distribution image thus being obtained, an image of a moving portion can be taken out and traced, and motion estimation becomes possible.

Figure 11A:
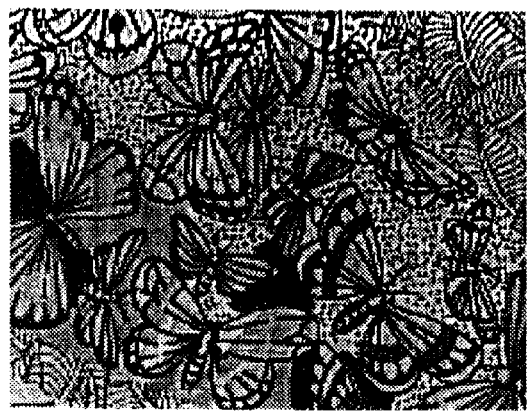
FIGS. 11A, 11B, 11C and 11D show photos of gray-scale images shown on a display to describe a case in which the present invention is applied to a zoom-out image.
Figure 11B:
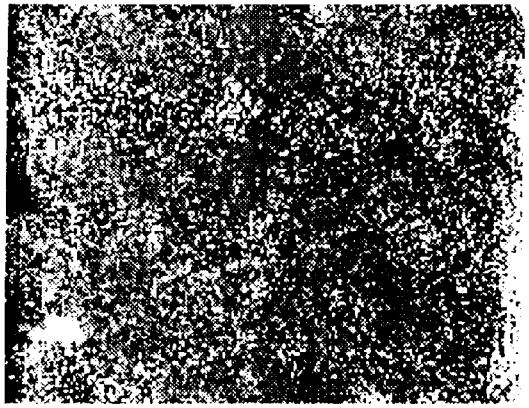
Figure 11C:
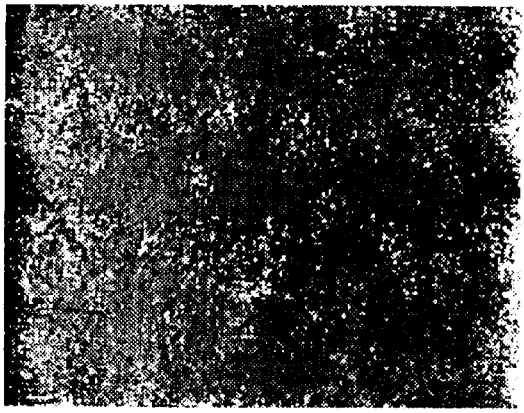
Figure 11D:
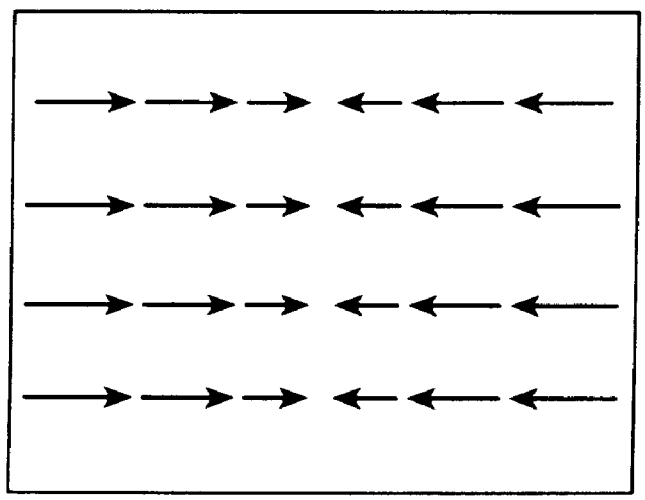

With reference now to FIGS. 11A–11D, when an image is zoomed out, it is considered the motion vector (horizontal component of the image) of a pixel has a direction toward the center of the image as shown in FIG. 11D and has a magnitude which increases as its position becomes away from the center line. FIG. 11A illustrates an image based upon source data representative of the image of butterflies. FIG. 11B show a zoom out of the image of FIG. 11A, where such FIG. 11B is a third-order motion distribution image corresponding to fr=1. In FIG. 11C, which shows the third-order motion distribution image corresponding to an fr=4, the density of a pixel in the image gradually becomes thick from the left end to the right end. In other words, the motion vector continuously changes its direction from negative to positive when the left direction is set to positive as the position moves from the left end to the right end. Its nature is similar to that shown in FIG. 11D. Therefore, it can be said that this image processing apparatus of the present invention can be utilized to can perform motion estimation for zooming.

Although only horizontal movement is used as an example to explain the present invention, the present invention is equally applicable to movement along other axes such as the vertical axis. Furthermore, the present invention can also be applied to estimation of a parameter which indicates depth.

Although in order to explain the present invention, the fourth-order motion distribution image is outputted as a final motion distribution image, another motion distribution image, that is, the first, second or third motion distribution image can be outputted as a final motion distribution image.

A computer program which implements each of the above processing can be offered to the user through network media such as the Internet and a digital satellite. In addition, a program storage device or an information recording media, such as a magnetic disk, a CD-ROM, a RAM, magnetic tape or a DVD, may be utilized to embody such a computer program. Such computer program may be executed by a machine to perform method steps for estimating motion in accordance with the present invention.

As described above, according to an image processing apparatus, an image processing method and a recording medium of the present invention, since motion estimation is performed in units of pixels by use of unbiased estimation, the spatial resolution of motion estimation is increased and robustness is ensured.

Although only certain embodiments have been described in detail, those having ordinary skill in the art will certainly understand that many modifications are possible without departing from the teachings hereof. All such modifications are intended to be encompassed within the following claims.

We claim:

1. A method for estimating motion of a motion picture, the motion picture comprising a plurality of images, the method comprising the steps of:

estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image;

estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image;

updating the first-order motion distribution image corresponding to the (k+1)-th image to generate a second-order motion distribution image corresponding to the (k+1)-th image;

predicting, from the image second-order motion distribution image corresponding to the (k+1)-th image, a third-order motion distribution image corresponding to the (k+2)-th image; and interpolating the third-order motion distribution image corresponding to the (k+2)-th image to generate a fourth-order motion distribution image corresponding to the (k+2)-th image, where k is an integer, and wherein the step of updating updates the first-order motion image distribution image corresponding to the (k+1)-th image using a higher than first-order motion distribution image generated from the k-th image.

2. The method according to claim 1, wherein the higher than first-order motion distribution image generated from the k-th image is a fourth-order motion distribution image corresponding to the (k+1)-th image.

3. The method according to claim 1, wherein the higher than first-order motion distribution image generated from the k-th image is a fourth-order motion distribution image corresponding to the (k+1)-th image, further comprising the steps of:

predicting from the first-order motion distribution image corresponding to the k-th image a third-order motion distribution image corresponding to the (k+1)-th image; and interpolating the (k+1)-th third-order motion distribution image to generate the fourth-order motion distribution image corresponding to the (k+1)-th image.

4. The method according to claim 1, wherein the step of predicting predicts a motion distribution image corresponding to the (k+2)-th image from the second-order image corresponding to the (k+1)-th image with an assumption that pixels move at a same speed as in the second-order image corresponding to the (k+1)-th image.

5. The method according to claim 1,
wherein the motion parameter includes a motion vector and an indication of reliability.

6. The method according to claim 5,
wherein the step of updating combines, for each pixel, a motion vector representing the first-order motion distribution image corresponding to the (k+1)-th image and a motion vector representing a higher than first-order motion distribution image generated from the k-th image according to the reliability of the first-order and the higher than first-order motion distribution image generated from the k-th image.

7. The method according to claim 6, wherein the higher than first-order motion distribution image generated from the k-th image is a fourth-order motion distribution image corresponding to the (k+1)-th image.

8. An apparatus for estimating motion of a motion picture, the motion picture comprising a plurality of images, the apparatus comprising:

means for estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image;

means for estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image;

means for updating the first-order motion distribution image corresponding to the (k+1)-th image to generate a second-order motion distribution image corresponding to the (k+1)-th image;

means for predicting, from the image second-order motion distribution image corresponding to the (k+1)-th image, a third-order motion distribution image corresponding to the (k+2)-th image; and means for interpolating the third-order motion distribution image corresponding to the (k+2)-th image to generate a fourth-order motion distribution image corresponding to the (k+2)-th image, where k is an integer, and wherein the means for updating updates the first-order motion image distribution image corresponding to the (k+1)-th image using a higher than first-order motion distribution image generated from the k-th image.

9. The apparatus according to claim 8, wherein the higher than first-order motion distribution image generated from the k-th image is a fourth-order motion distribution image corresponding to the (k+1)-th image.

10. The apparatus according to claim 8, wherein the higher than first-order motion distribution image generated from the k-th image is a fourth-order motion distribution image corresponding to the (k+1)-th image, wherein the means for predicting predicts from the first-order motion distribution image corresponding to the k-th image a third-order motion distribution image corresponding to the (k+1)-th image; and the interpolating means interpolates the (k+1)-th third-order motion distribution image to generate the fourth-order motion distribution image corresponding to the (k+1)-th image.

11. The apparatus according to claim 8,
wherein the means for predicting predicts a motion distribution image corresponding to the (k+2)-th image from the second-order image corresponding to the (k+1)-th image with an assumption that pixels move at a same speed as in the second-order image corresponding to the (k+1)-th image.

12. The apparatus according to claim 8,
wherein the motion parameter includes a motion vector and an indication of reliability.

13. The apparatus according to claim 12,
wherein the means for updating combines, for each pixel, a motion vector representing the first-order motion distribution image corresponding to the (k+1)-th image and a motion vector representing a higher than first-order motion distribution image generated from the k-th image according to the reliability of the first-order and the higher than first-order motion distribution image generated from the k-th image.

14. The apparatus according to claim 13, wherein the higher than first-order motion distribution image generated from the k-th image is a fourth-order motion distribution image corresponding to the (k+1)-th image.

15. An apparatus for estimating motion of a motion picture, the motion picture comprising a plurality of images, the apparatus comprising:

a circuit for estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image;

a circuit for estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image;

a circuit for updating the first-order motion distribution image corresponding to the (k+1)-th image to generate a second-order motion distribution image corresponding to the (k+1)-th image;

means for predicting, from the image second-order motion distribution image corresponding to the (k+1)-th image, a third-order motion distribution image corresponding to the (k+2)-th image; and a circuit for interpolating the third-order motion distribution image corresponding to the (k+2)-th image to generate a fourth-order motion distribution image corresponding to the (k+2)-th image, where k is an integer, and wherein the circuit for updating updates the first-order motion image distribution image corresponding to the (k+1)-th image using a higher than first-order motion distribution image generated from the k-th image.

16. The apparatus according to claim 15, wherein the higher than first-order motion distribution image generated from the k-th image is a fourth-order motion distribution image corresponding to the (k+1)-th image.

17. The apparatus according to claim 15, wherein the higher than first-order motion distribution image generated from the k-th image is a fourth-order motion distribution image corresponding to the (k+1)-th image, wherein the circuit for predicting predicts from the first-order motion distribution image corresponding to the (k+1)-th image a third-order motion distribution image corresponding to the k-th image; and the interpolating means interpolates the (k+1)-th third-order motion distribution image to generate the fourth-order motion distribution image corresponding to the (k+1)-th image.

18. The apparatus according to claim 15, wherein the circuit for predicting predicts a motion distribution image corresponding to the (k+2)-th image from the second-order image corresponding to the (k+1)-th image with an assumption that pixels move at a same speed as in the second-order image corresponding to the (k+1)-th image.

19. The apparatus according to claim 15, wherein the motion parameter includes a motion vector and an indication of reliability.

20. The apparatus according to claim 19, wherein the circuit for updating combines, for each pixel, a motion vector representing the first-order motion distribution image corresponding to the (k+1)-th image and a motion vector representing a higher than first-order motion distribution image generated from the k-th image according to the reliability of the first-order and the higher than first-order motion distribution image generated from the k-th image.

21. The apparatus according to claim 20, wherein the higher than first-order motion distribution image generated from the k-th image is a fourth-order motion distribution image corresponding to the (k+1)-th image.

22. An apparatus for estimating motion of a motion picture, the motion picture comprising a plurality of images, the apparatus comprising:

a first estimator for estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image;

a second estimator for estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image;

an updater for updating the first-order motion distribution image corresponding to the (k+1)-th image to generate a second-order motion distribution image corresponding to the (k+1)-th image;

a predictor for predicting, from the image second-order motion distribution image corresponding to the (k+1)-th image, a third-order motion distribution image corresponding to the (k+2)-th image; and an interpolator for interpolating the third-order motion distribution image corresponding to the (k+2)-th image to generate a fourth-order motion distribution image corresponding to the (k+2)-th image, where k is an integer, and wherein the updater updates the first-order motion image distribution image corresponding to the (k+1)-th image using a higher than first-order motion distribution image generated from the k-th image.

23. The apparatus according to claim 22, wherein the higher than first-order motion distribution image generated from the k-th image is a fourth-order motion distribution image corresponding to the (k+1)-th image.

24. The apparatus according to claim 22, wherein the higher than first-order motion distribution image generated from the k-th image is a fourth-order motion distribution image corresponding to the (k+1)-th image, wherein the predictor predicts from the first-order motion distribution image corresponding to the k-th image a third-order motion distribution image corresponding to the (k+1)-th image; and the interpolator interpolates the (k+1)-th third-order motion distribution image to generate the fourth-order motion distribution image corresponding to the (k+1)-th image.

25. The apparatus according to claim 22, wherein the predictor predicts a motion distribution image corresponding to the (k+2)-th image from the second-order image corresponding to the (k+1)-th image with an assumption that pixels move at a same speed as in the second-order image corresponding to the (k+1)-th image.

26. The apparatus according to claim 22, wherein the motion parameter includes a motion vector and an indication of reliability.

27. The apparatus according to claim 26, wherein the circuit for updating combines, for each pixel, a motion vector representing the first-order motion distribution image corresponding to the (k+1)-th image and a motion vector representing a higher than first-order motion distribution image generated from the k-th image according to the reliability of the first-order and the higher than first-order motion distribution image generated from the k-th image.

28. The apparatus according to claim 27, wherein the higher than first-order motion distribution image generated from the k-th image is a fourth-order motion distribution image corresponding to the (k+1)-th image.

29. A program storage device readable by a machine, tangibly embodying a program of instructions executable by the machine to perform method steps for estimating motion of a motion picture, the method steps comprising:

estimating from a k-th image and a (k+1)-th image a motion parameter corresponding to each pixel of the k-th image to generate a first-order motion distribution image corresponding to the k-th image, the first-order motion distribution image corresponding to the k-th image represented by the motion parameters corresponding to the pixels of the k-th image;

estimating from at least the (k+1)-th image a motion parameter corresponding to each pixel of the (k+1)-th image to generate a first-order motion distribution image corresponding to the (k+1)-th image, the first-order motion distribution image corresponding to the (k+1)-th image represented by the motion parameters corresponding to the pixels of the (k+1)-th image;

updating the first-order motion distribution image corresponding to the (k+1)-th image to generate a second-order motion distribution image corresponding to the (k+1)-th image;

predicting, from the image second-order motion distribution image corresponding to the (k+1)-th image, a third-order motion distribution image corresponding to the (k+2)-th image; and interpolating the third-order motion distribution image corresponding to the (k+2)-th image to generate a fourth-order motion distribution image corresponding to the (k+2)-th image, where k is an integer, and wherein the step of updating updates the first-order motion image distribution image corresponding to the (k+1)-th image using a higher than first-order motion distribution image generated from the k-th image.

30. The program storage device according to claim 29, wherein the higher than first-order motion distribution image generated from the k-th image is a fourth-order motion distribution image corresponding to the (k+1)-th image.

31. The program storage device according to claim 29 wherein the higher than first-order motion distribution image generated from the k-th image is a fourth-order motion distribution image corresponding to the (k+1)-th image, said method steps further comprising:

predicting from the first-order motion distribution image corresponding to the k-th image a third-order motion distribution image corresponding to the (k+1)-th image; and interpolating the (k+1)-th third-order motion distribution image to generate the fourth-order motion distribution image corresponding to the (k+1)-th image.

32. The program storage device to claim 29, wherein the step of predicting predicts a motion distribution image corresponding to the (k+2)-th image from the second-order image corresponding to the (k+1)-th image with an assumption that pixels move at a same speed as in the second-order image corresponding to the (k+1)-th image.

33. The program storage device according to claim 29, wherein the motion parameter includes a motion vector and an indication of reliability.

34. The program storage device according to claim 33, wherein the step of updating combines, for each pixel, a motion vector representing the first-order motion distribution image corresponding to the (k+1)-th image and a motion vector representing a higher than first-order motion distribution image generated from the k-th image according to the reliability of the first-order and the higher than first-order motion distribution image generated from the k-th image.

35. The program storage device according to claim 34, wherein the higher than first-order motion distribution image generated from the k-th image is a fourth-order motion distribution image corresponding to the (k+1)-th image.

\* \* \* \* \*